United States Patent [19]
Warchol

[11] Patent Number: 5,309,569
[45] Date of Patent: May 3, 1994

[54] SELF-CONFIGURING BUS TERMINATION COMPONENT

[75] Inventor: Nicholas A. Warchol, Boxborough, Mass.

[73] Assignee: Digital Equipment Corporation, Maynard, Mass.

[21] Appl. No.: 874,288

[22] Filed: Apr. 24, 1992

[51] Int. Cl.⁵ .............................................. G06F 13/40
[52] U.S. Cl. .................................. 395/325; 395/725; 395/425; 364/DIG. 1; 364/232.8; 364/240; 364/242.92
[58] Field of Search .............. 395/325, 200, 725, 425, 395/147, 542; 307/147, 542

[56] References Cited

U.S. PATENT DOCUMENTS

| | | |
|---|---|---|
| 4,220,876 | 9/1980 | Ray .................................. 307/296 |
| 4,675,551 | 6/1987 | Stevenson et al .................. 307/443 |
| 4,920,339 | 4/1990 | Friend et al. .................. 340/825.52 |
| 5,001,625 | 3/1991 | Thomas et al. ...................... 395/325 |
| 5,029,284 | 7/1991 | Feldbaumer et al. ............... 307/443 |
| 5,034,883 | 7/1991 | Donaldson et al. ................. 395/325 |
| 5,065,314 | 11/1991 | Maskovyak .......................... 395/325 |
| 5,083,259 | 1/1992 | Maresh et al. ....................... 395/325 |
| 5,099,137 | 3/1992 | Lattin, Jr. ............................ 307/147 |
| 5,109,492 | 4/1992 | Noguchi et al. ..................... 395/325 |
| 5,117,331 | 5/1992 | Gebara ................................. 307/542 |
| 5,136,187 | 8/1992 | Ceccherelli ......................... 307/443 |

Primary Examiner—Michael R. Fleming
Assistant Examiner—Tarig R. Hafiz
Attorney, Agent, or Firm—Kenyon & Kenyon

[57] ABSTRACT

A termination component that is capable of configuring itself to accommodate buses having different electrical characters that connect to it. The termination component includes resistor lines and resistor-diode lines that connect to a power source. These resistor lines and resistor-diode lines when properly powered permit the self-configuration of the termination component.

11 Claims, 2 Drawing Sheets

SELF-CONFIGURING BUS TERMINATION COMPONENT

FIELD OF THE INVENTION

The present invention relates to circuits that are used to terminate the ends of buses. More particularly, the present invention relates to circuits that are used to terminate the ends of buses that permit buses having different electrical characteristics to be coupled to them.

BACKGROUND OF THE INVENTION

In many computer network applications, several different types of systems or devices may be connected to a common backplane. From within a computer system enclosure, storage units may connect to the common backplane and from without that enclosure, devices or systems that may desire to connect to the storage units do so through the backplane. The system or device that connects to the storage device through the backplane may do so through an interconnect bus that operates according, for example, the Small Computer Storage Interconnect ("SCSI") protocol, an industry standard. The storage units to which this interconnect bus connects also operate according to the SCSI protocol.

Another protocol which a system or device may use for its interconnection bus is the Digital Small System Interconnect ("DSSI") protocol. The DSSI protocol has been developed by Digital Equipment Corporation, Maynard, Massachusetts, and is the subject of co-pending U.S. application Ser. No. 07/562,433, filed Jul. 19, 1990.

The interconnect bus for using either SCSI or DSSI protocol may be part of an interface. Therefore, the interconnect buses will be referred to as a SCSI bus or a DSSI bus to denote the operable protocol.

Electrical signals that form the SCSI or DSSI bus operate as transmission lines. As such, it is necessary to terminate these transmission lines at both ends with a termination component. This termination component must have an impedance equivalent to the electrical characteristics of the transmission lines.

The DSSI bus has different electrical characteristics than the SCSI bus. For example, the impedance, bus driver, and receiver components are different for each bus. The existence of the different electrical characteristics for the DSSI and SCSI buses results in the DSSI bus having improved signal integrity by preventing voltage overshoots and undershoots. This improves the noise margin between logic "0" and logic "1" values.

With regard to the bus driver components for the two buses, the driver for SCSI bus is capable of sinking a load of up to 48 mA of current, while the driver for the DSSI bus is capable of sinking loads as high as 100 mA of current. Therefore, the DSSI bus drivers can be used to drive a SCSI bus since the DSSI driver components are under stressed when operated to perform this task. However, the DSSI and SCSI buses have distinctive impedances. As such, a storage device operating under the SCSI protocol cannot connect to a DSSI bus and vice versa because the bus termination component could not match the impedance in both directions.

Even though logical signalling of information on a SCSI or DSSI bus is the same, the SCSI bus requires a termination impedance of 132 Ω, while the DSSI bus requires a termination impedance of 85 Ω. Normally, the electrical characteristics of the termination component associated with either the SCSI or DSSI bus match those of that bus. This, however, causes problems when a system is configured with termination components that are married to either SCSI or DSSI technology because storage units that are supported by storage assemblies may change or at the time of manufacture may not be known. Therefore, every time a storage unit is changed or a decision is reached with regard to storage units, it may result in the necessity to change the termination component to accommodate the particular bus and storage unit connected to it through the termination component.

Changing termination components either at the manufacturing site or in the field requires time and expertise which is not always available. Moreover, the removal or swapping of termination components requires that unused components be saved in case the original storage units are needed again. Mechanical switches to select the proper termination components are cumbersome and expensive.

Accordingly, it would be desirous to have a termination component that is capable of operating at more than one impedance to accommodate more than one bus type to be connected to it.

SUMMARY OF THE INVENTION

The present invention is a termination component that configures its impedance based on whether a SCSI or a DSSI bus is connected to it. The termination component of the present invention includes resistor-diode circuits that couple to the signal lines that connect the SCSI or DSSI bus, and a storage assembly to which the systems or devices coupled to the SCSI and DSSI bus connect. The termination component may be part of an input/output module at a backplane assembly.

The termination component is connected to the power supply of the storage assembly. If the storage unit operates under a SCSI protocol because a SCSI bus is connected to the termination component, the power supply supplies the appropriate voltage to the termination component so that it will generate the appropriate impedance. Similarly, if the storage device operates under the DSSI protocol because a DSSI bus is connected to the termination component, the power supply supplies the appropriate voltage to the termination component to generate the appropriate impedance.

The resistor-diode circuit has first, second, and third resistors types, and a diode associated with each of the resistors of the third resistor type. The resistor-diode circuit has a first line and second line that connect to the storage assembly power supply. The first and second lines connect to each of the signal lines of the termination component that connects to the SCSI bus or DSSI bus, and the storage assembly.

When the SCSI bus is connected to the termination component, the first line is powered by the power supply. When the DSSI bus is connected to the termination component, the first and second lines are powered by the power supply.

The first line connects to a plurality of parallel disposed resistor lines. Each of the plurality of resistor lines includes a first and second resistors that are connected in series. Each resistor line connects to ground after the second resistor. A first signal line connects to the first resistor line between the two resistors. Subsequent signal lines connect to respective resistor lines between the two resistors. The number of resistor lines that connect to the first line depends on the number of signal lines of the SCSI or DSSI bus because there is a resistor line for each signal line.

The second line connects to a plurality of parallel disposed diode-resistor lines. Each of the plurality of diode-resistor lines includes a diode, a third resistor, and the second resistor connected in series. Each diode-resistor line connects to ground after the second resistor. The first signal line connects to the first diode-resistor line between the third and second resistors. Subsequent signal lines connect to respective diode-resistor lines between the third and second resistors. Again the number of diode-resistor lines that connect to the second line depends on the number of signal lines of the SCSI or DSSI bus.

When a SCSI bus is connected to the termination component, power is supplied to the first line. This results in the proper impedance being provided at the signal lines. When a DSSI bus is connected to the termination component, power is supplied to the first and second lines which results in the proper impedance being provided to the signal lines. Therefore, depending on whether the SCSI bus or the DSSI bus is connected to the terminal component, the termination component is self-configurable such that the impedance needs for both a SCSI bus and a DSSI bus are met.

DETAILED DESCRIPTION OF THE INVENTION

The present invention is a bus termination component that is capable of self-configuration for matching the impedance of the bus connected to it.

Figure 1:
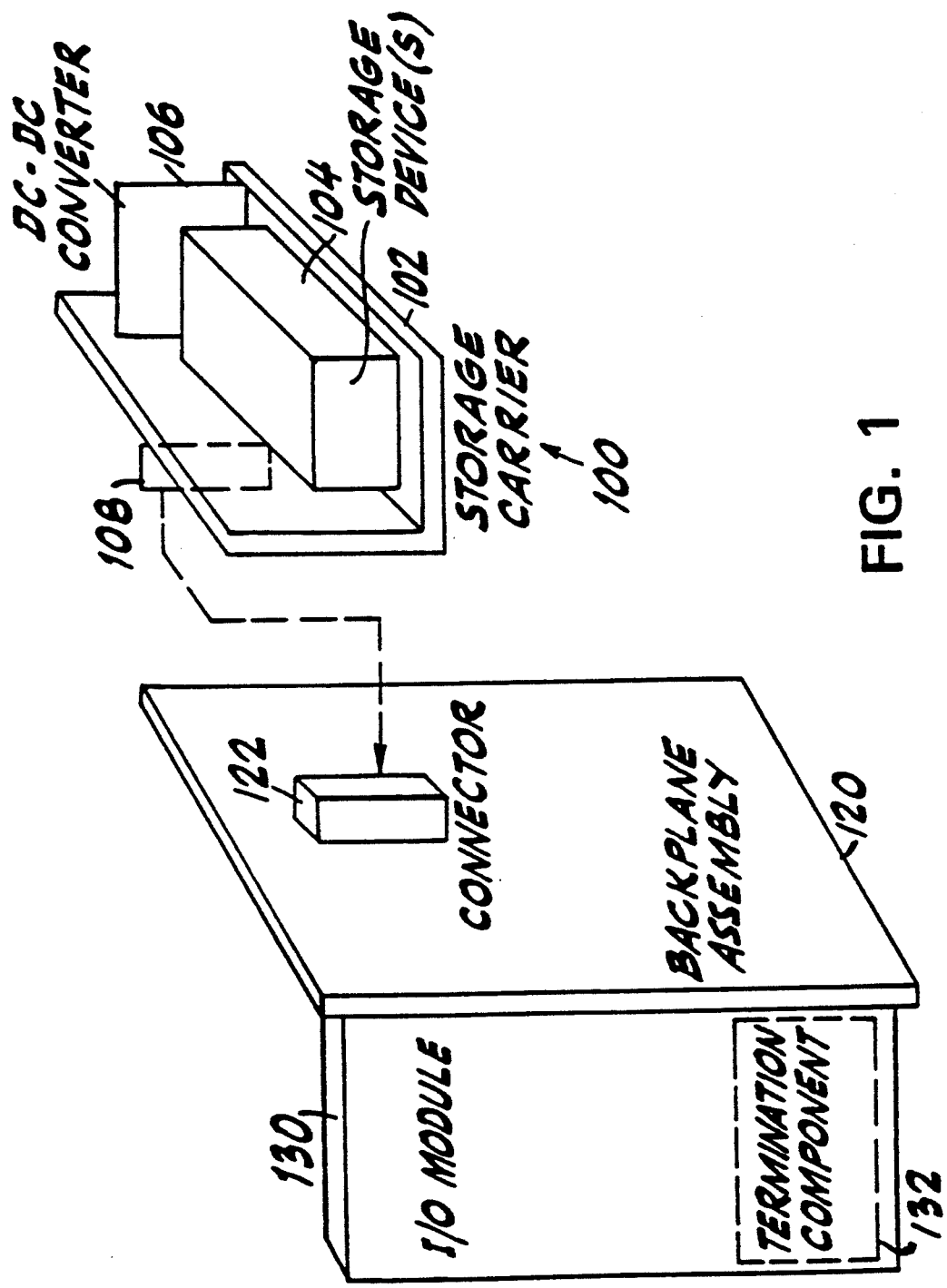
FIG. 1 is a perspective view of portions of a computer system incorporating the self-configuring bus termination of the present invention.

Referring to FIG. 1, a portion of a computer system is shown. The portion that is shown includes a storage carrier 100 that has storage device support 102, storage device 104 mounted on the support, and DC-DC converter 106 that connects to storage device 104 and first connector 108. The storage carrier is the subject of co-pending application Ser. No. 51/829,654, filed Feb. 3, 1992. The storage device or devices that are supported by the storage carrier may be configured for the SCSI or DSSI protocol.

Connector 108 connects to second connector 122 of backplane assembly 120. Input/output ("I/O") module 130 connects to backplane assembly 120. I/O module 130 includes termination component 132. The termination component connects to storage device 104 and DC—DC converter 106 through first connector 108 and second connector 122. I/O module 130 connects to the SCSI or DSSI bus. In particular, termination component 132 of the I/O module connects to the SCSI or DSSI bus.

Figure 2:
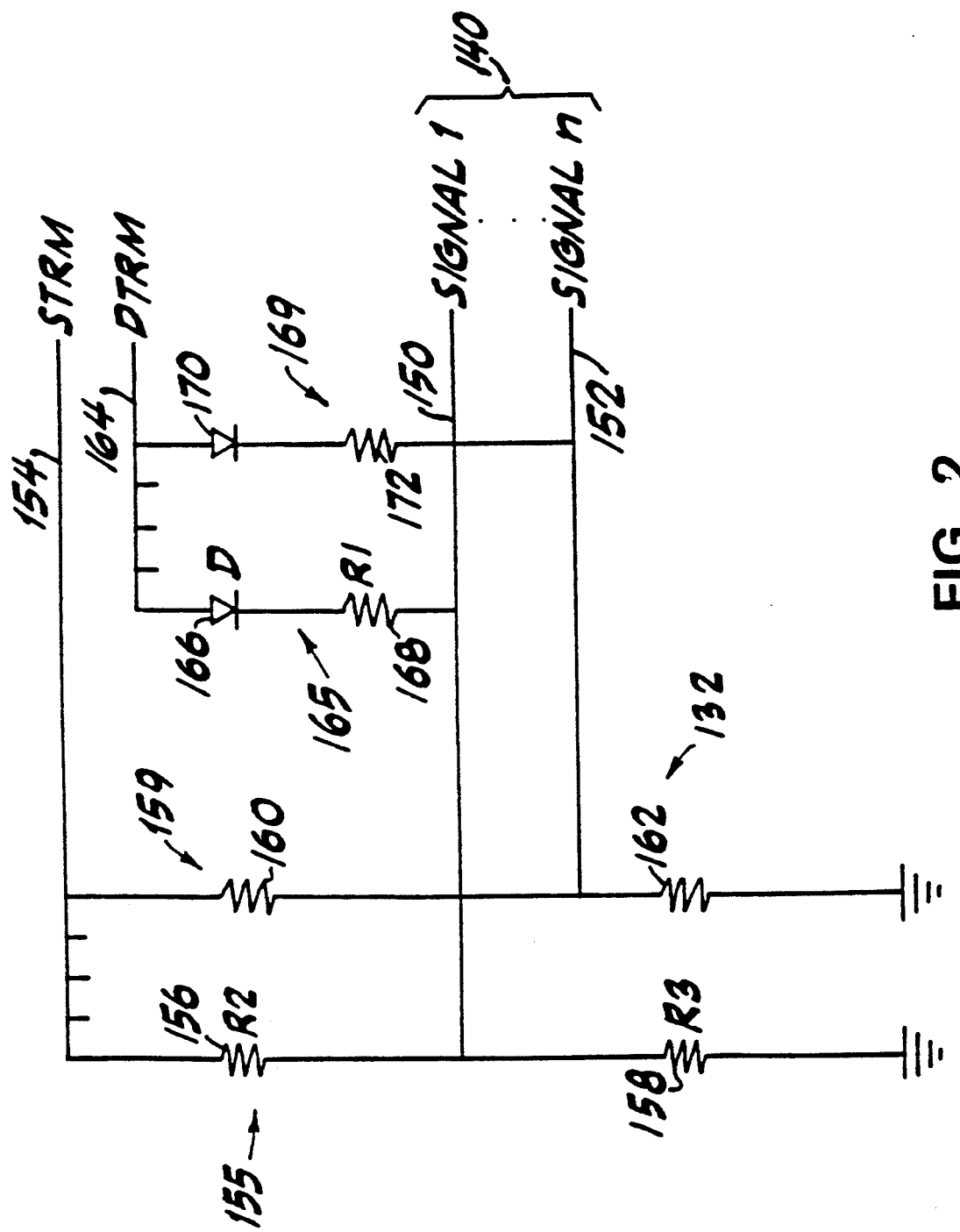
FIG. 2 is a circuit diagram of self-configuring bus termination component of the present invention.

FIG. 2, a circuit diagram of the termination component 132 of the present invention is shown. As shown, there are n signal lines 140 of termination component 132. These signal lines terminate the transmission lines of SCSI or DSSI bus. For representation purposes only, first signal line 150 and nth signal line 152 are shown.

STRM line 154 and DTRM line 162 connect to DC—DC converter 106 of storage carrier 100. DC—DC converter 106 provides a termination voltage to STRM line 154 when a SCSI bus connects to termination component 132 and a termination voltage to both STRM line 154 and DTRM line 164 when a DSSI bus connects to the termination component.

STRM line 154 connects to the first signal line 150 to the nth signal line 152 via n parallel resistor lines of which the first resistor line 155 and nth resistor line 159 are shown in FIG. 2. First resistor line 155 includes R2 resistor 156 and R3 resistor 158 connected in series. Thereafter, the resistor line 155 connects to ground. Nth resistor line 159 includes R2 resistor and R3 resistor 162 that are connected in series. R3 resistor 162 then connects to ground.

R2 resistors 156 and 160, which are representative of the R2 resistors in the n resistor lines, have the same value. Similarly, R3 resistors 158 and 162, which are representative of the R3 resistors in the n resistor lines, have the same value. First signal line 150 to the nth signal line 152 connect respectively to the first resistor line 155 to the nth resistor line 159 between the R2 and R3 resistors.

DTRM line 164 connects to the first signal line 150 to the nth signal line 152 via n parallel diode-resistor lines of which first diode-resistor line 165 and nth diode-resistor line 169 are shown in FIG. 2. The first diode-resistor line includes D diode 166, R1 resistor 168, and R3 resistor 158 that are connected in series. After this, these series connected elements connect to ground. Nth diode-resistor line 169 has D diode 170, R1 resistor 172, and R3 resistor 162 that are connected in series. R3 resistor 158, thereafter, connects to ground.

D diodes 166 and 170 are representative of the n D diodes in the n diode-resistor lines. These diodes are the same type of diode. The diodes prevent the cross-coupling of signal lines when a SCSI storage carrier is used and DTRM lines 164 is unconnected. For example, referring to FIG. 2, if the DTRM line 164 is unconnected, then first signal line 150 and nth signal line 152 are connected via the series circuit of resistor 168, diode 166, diode 170, and resistor 172. Since the diodes are connected back-to-back, voltage Variations on either of those signal lines will not effect the other because each diode isolates the portion of the circuit in which it is disposed. R1 resistors 168 and 172 which are representative of the R1 resistors in the n diode-resistor lines have the same value. In like manner, as stated, R3 resistors 158 and 162 are representative of the R3 resistors in the n diode-resistor lines. The first signal line 150 to nth signal line 152 connect respectively to the first diode-resistor line 166 to the nth diode-resistor line 169 between the R1 and R3 resistors.

When a SCSI or DSSI bus is connected to the I/O module 132, termination component 132 terminates the end of the SCSI or DSSI bus associated With storage carrier 100 supporting storage device 104. If a SCSI bus is connected to I/O module 130 and storage devices 104 operates under the SCSI protocol, the computer system provides the appropriate voltage through DC—DC converter 106 to STRM line 154. When this happens, each of the n resistor lines from first resistor line 155 to the nth resistor line 159 match the 132 $\Omega$ impedance of the SCSI bus. According to the circuit in FIG. 2, the following expression shows how the 132 impedance is calculated.

$$\frac{1}{\frac{1}{R2}+\frac{1}{R3}} = 132 \, \Omega \qquad (1)$$

Similarly, when a DSSI bus is connected to I/O module 130 and the storage device operates according to the DSSI protocol, termination component 132 has an impedance of 85 Ω. This is achieved by the computer system supplying the appropriate voltage to STRM line 154 and DTRM line 164. This will provide the 85 Ω impedance to the n signal lines. The impedance is calculated according to the following equation:

$$\frac{1}{\frac{1}{R1}+\frac{1}{R2}+\frac{1}{R3}} = 85 \, \Omega \qquad (2)$$

A logic "0" value occurs when a signal line is undriven by any device coupled to it. This logic "0" value must be far enough above the switching threshold of bus receiver devices to avoid noise induced false switching. It has been found that the logic low voltage as a minimum must be 3.0 volts. However, the minimum voltage supplied to STRM line 154 and DTRM 164 preferably is 4.45 volts. Under these circumstances, the logic "0" value is determined according to the following expression:

$$V = \frac{(R1)(R3)(STRM) + (R2)(R3)(DTRM - V_{diode})}{(R1)(R3) + (R2)(R3) + (R1)(R2)} > 3.0 \text{ Volts} \qquad (3)$$

where, $V_{diode}$ = the standard cut-in voltage of a silicon junction diode which is 0.7 volts.

Possible resistor values that may be used are the following:

$$R1 = 243 \, \Omega, R2 = 220 \, \Omega, \text{ and } R3 = 330 \, \Omega. \qquad (4)$$

With the above resistor values, the SCSI termination impedance will be 132 Ω, the DSSI termination impedance will be 85.5 Ω, and the logic "0" value voltage minimum will be 3.05 volts.

The terms and expressions which are employed herein are used as terms of expression and not of limitation. And, there is no intention, in the use of such terms and expression, of excluding the equivalents of the features shown, and described, or portions thereof, it being recognized that various modifications are possible within the scope of the invention.

What is claimed is:

1. A circuit that is configurable for terminating a bus which operates, at any given time, according to one of at least a first and second bus protocol, the circuit comprising:

n signal lines for connecting to a bus which operates, at any given time, according to one of at least the first and second bus protocols;

power supply means for powering the circuit according to a first characteristic of the bus when the bus is operated according to the first bus protocol and according to a second characteristic of the bus when the bus is operated according to the second bus protocol;

n resistor-diode subcircuits connected respectively to the n signal lines, and connected to the power supply means, with each of the n resistor-diode subcircuit providing a first impedance level to the connected signal line when powered by the power supply means; and n resistor subcircuits connected respectively to the n signal lines, and connected to the power supply means, with each of the resistor subcircuits when powered by the power supply means along with the corresponding diode-resistor subcircuit connected to the same signal line being powered by the power supply, providing a second impedance level to the connected signal line.

2. The circuit as recited in claim 1, wherein a diode-resistor subcircuit further comprises a diode, a first resistor, and a third resistor connected in series.

3. The circuit as recited in claim 2, wherein a resistor subcircuit further comprises a second resistor and the third resistor connected in series.

4. The circuit of claim 1, wherein the first bus protocol is a SCSI bus protocol.

5. The circuit of claim 1, wherein said second bus protocol is a DSSI bus protocol.

6. The circuit as recited in claim 1, wherein the circuit is implemented in a backplane assembly.

7. The circuit as recited in claim 6, wherein the circuit is implemented in an input/output portion of a backplane assembly.

8. In a circuit including n diode-resistor circuits connected to n signal lines connected to n bus lines to provide one of a first impedance level and a second impedance level, a method for terminating buses operated using one of a first protocol and a second protocol, comprising the steps of:

powering each of the n diode-resistor circuits connected to the n signal lines connected to the n bus lines to provide the first impedance level on the n signal lines for impedance matching when the bus is operated using the first protocol; and powering each of the n resistor circuits and each of the n diode-resistor circuits connected to the n signal lines connected to the n bus lines to provide the second impedance level on the n signal lines for impedance matching when the bus is operated using the second protocol.

9. The method as recited in claim 8, wherein powering includes powering the diode-resistor or resistor circuits with a power supply.

10. The method as recited in claim 8, wherein the diode-resistor circuits includes a diode, a first resistor, and a third resistor connected in series.

11. The method as recited in claim 10, wherein the resistor circuits include a second resistor and the third resistor connected in series.

* * * * *